United States Patent

[11] 3,598,918

[72] Inventors Alfred G. Dee
Elmont, L.I.;
Jos Van Marrewyk, Valley Stream, both of, N.Y.
[21] Appl. No. 680,862
[22] Filed Nov. 6, 1967
[45] Patented Aug. 10, 1971
[73] Assignee Eaton Yale & Towne, Inc.
Cleveland, Ohio

[54] ELECTRONIC-SIGNALING DEVICE FOR INTERCONNECTION WITH TELEPHONE SYSTEM INTERFACING DEVICES
6 Claims, 2 Drawing Figs.

[52] U.S. Cl. ..... 179/5 P
[51] Int. Cl. ..... H04m 11/04
[50] Field of Search ..... 179/5, 5 P

[56] References Cited
UNITED STATES PATENTS

| | | | |
|---|---|---|---|
| 2,555,714 | 6/1951 | Talbot | 179/5 |
| 2,827,515 | 3/1958 | Zuber | 179/5 |
| 3,188,392 | 6/1965 | Ferrell | 179/5 |
| 3,407,269 | 10/1968 | Brzoska | 179/5 |

*Primary Examiner*—Kathleen H. Claffy
*Assistant Examiner*—David L. Stewart
*Attorney*—Teagno and Toddy

ABSTRACT: An electronic-signaling device for transmitting messages over an automatically seized telephone line to predetermined recipients such as police stations, fire stations, central security offices and the like. The device includes an endless magnetic tape having two signal tracks prerecorded therein, one of tone signals providing for seizure of the telephone line and simulated telephone number dialing without the lifting of a receiver off the hook, and the other of audio signals providing a series of messages stating the nature of the emergency. A tone stop signal incorporated in the message track serves to deactivate the device upon completion of the transmission. A key-operated switch is provided to permit the device to be conditioned so as to prevent inadvertent dialing, and activation of the device may be effected through closing of the supervisory circuit either by a manually operated panic button or by application of an emergency-generated starting potential to a suitable relay.

PATENTED AUG 10 1971 3,598,918

INVENTORS
ALFRED G DEE
and
JOS VAN MARREWYK
BY Jacob L. Kollin
ATTORNEY

ELECTRONIC-SIGNALING DEVICE FOR INTERCONNECTION WITH TELEPHONE SYSTEM INTERFACING DEVICES

BACKGROUND OF THE INVENTION

This invention relates to electronic-signaling devices or systems, and more particularly to systems of such a class which can be automatically connected into a telephone line for the transmission of predetermined information.

Although the present invention is of general utility in the field of giving information or notice of various types of situations to interested parties, for the sake of simplicity and conciseness the following description will deal primarily with a burglary or holdup alarm system, it being understood that the system may be employed as readily for transmitting information relating to fires or other types of emergency situations that may occur.

Many homes and business establishments are protected by silent burglary and holdup alarm systems which do not give the usual audible alarms but rather are connected to a central security station, usually the offices of a private guard or detective company, there to provide an alert for the dispatch of help. Such systems and the attendant protective service are, of course, relatively expensive and frequently are beyond the means of private homeowners and operators of small businesses. Moreover, a signal sent out by such an alarm system at the location of an emergency is generally received at the security station simply in the form of a visual and/or audible signal, and thus it is necessary for the monitor first to correlate the signal with the identity of the subscriber before a telephone call can be placed to the nearest police station to alert the authorities of the nature and location of the emergency. Under this type of arrangement, even a minor delay in responding to the alarm, occasioned by the time required to place the call and relay the information to the police, let alone a major delay caused by inattentiveness or a misreading of the signal by the monitor at the central security office, be sufficient to permit the state of emergency to get out of hand completely, i.e. for the burglar or holdup man to complete his crime and make good his escape. Where armed guards to respond to an alarm are provided by the security organization itself, the message relaying delay may well be eliminated, but such a service is even more expensive.

SUMMARY OF THE INVENTION

It is an important object of the present invention, therefore, to provide a novel electronic-signaling device which is inexpensive to install and maintain and which, when used as an alarm system, does not require a subscription to a private protective organization.

It is also an object of the present invention to provide such an electronic-signaling system in which spoken messages advising of the nature and location of the emergency are automatically transmitted over the ordinary telephone lines to any preselected recipient without the necessity of the sender removing the receiver off the hook of his telephone instrument and without any need for modifications of the switching equipment at the central telephone office.

Another object of the present invention is the provision of such a system in which upon activation thereof in case of emergency, a preprogrammed endless magnetic tape will in sequence provide a signal to connect the system to a telephone line, simulate a dialing of a preselected telephone number, e.g. that of a nearby police station, and provide a predetermined message to be transmitted via the dialed connection advising of the nature of the emergency and the location where it is taking place.

Yet another object of the present invention is the provision of such a system in which a number of different dialing cycles are prerecorded into the tape in alternating sequence with a number of different message cycles so as to permit messages to be sent transmitted sequentially to different locations, e.g. different police stations.

It is still another object of the present invention to provide an electronic-signaling system as aforesaid which automatically deactivates itself, after completion of the last message transmission, with the magnetic tape in the precise position required for immediate commencement of the first dialing cycle at the next activation of the system.

Generally speaking, an electronic-signaling system according to the present invention comprises a supervisory or control circuit to activate and deactivate the system, a telephone line seizing and dialing channel, and an audio or message channel. The control circuit can be energized by a momentary closing of a switch and has electronic-holding circuitry to keep it energized. A motor started by energization of the control circuit drives an endless magnetic tape having prerecorded therein one track which provides a tone signal to seize the telephone line and perform the several dialing operations, and another separate track which provides in an alternating sequence with the dialing signal cycles of the tone trace the audio or spoken message signal cycles to be transmitted over the telephone line after each dialing operation is completed. Within each message cycle, the same message is preferably repeated a number of times, and the duration of each such cycle is sufficient to give a person whose number has been dialed ample opportunity to lift up the receiver at the other end of the line and to get a complete message. When the last message cycle has been completed, the audio track provides a tone signal to deenergize the control circuit and deactivate the entire system, this stop signal being programmed into the audio track of the tape immediately preceding the start of the first signal cycle in the tone track so that misalignments of the tape relative to the magnetic reading head preparatory for the next activation of the system are effectively eliminated. The magnetic tape preferably is arranged in the form of a removable cartridge so that each user of the system may program his tape with the dialing and message signals which he desires or finds necessary.

BRIEF DESCRIPTION OF THE DRAWING

The foregoing and other objects, characteristics and advantages of the present invention will be more fully understood from the following detailed description of a preferred embodiment thereof when read in conjunction with the accompanying drawing, in which.

PREFERRED EMBODIMENT

Figures 1, 2:
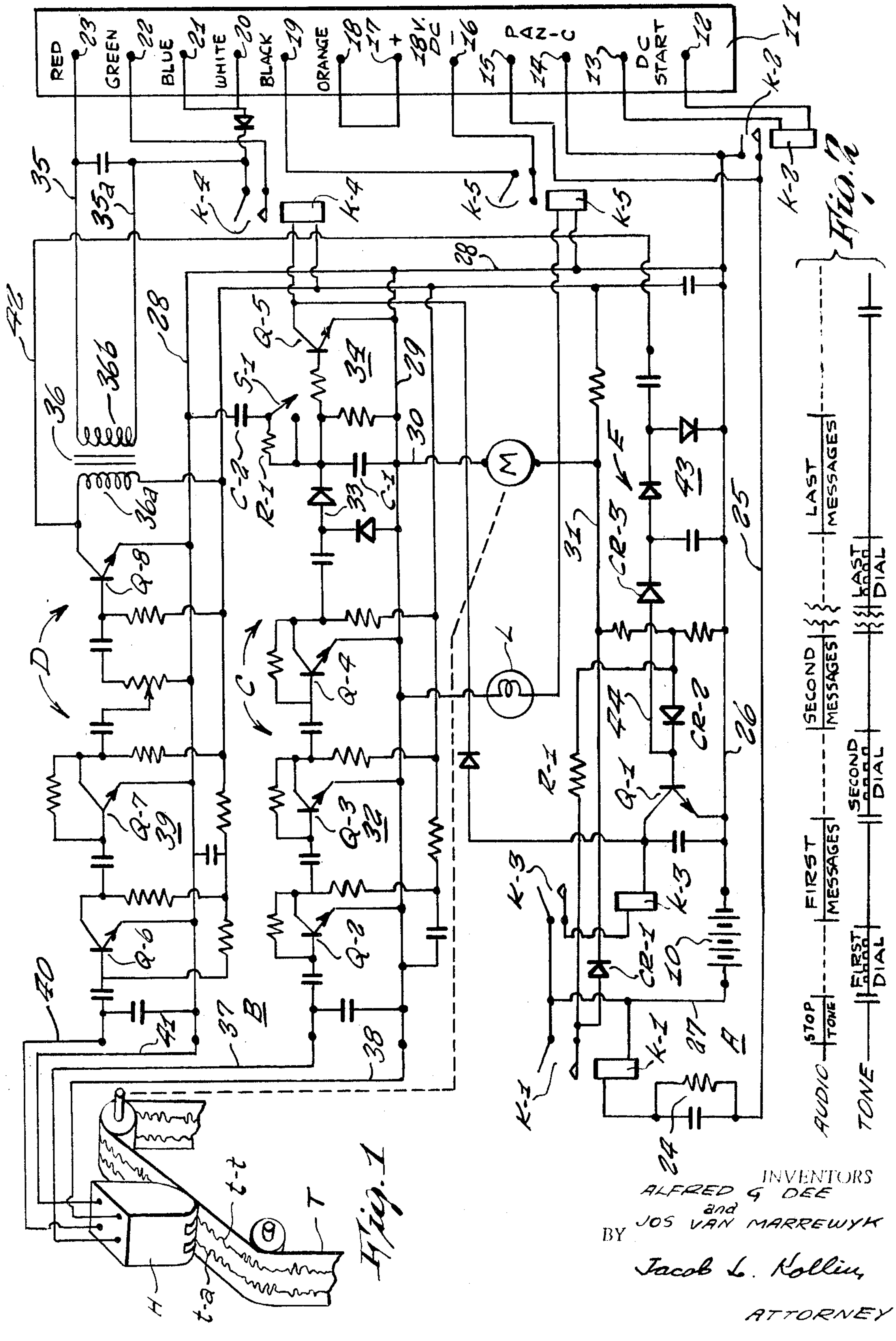
FIG. 1 is a schematic circuit diagram of a silent alarm system according to the present invention and diagrammatically shows a prerecorded, dual track, endless magnetic tape cartridge and magnetic reading head therefor.
FIG. 2 is a graphic representation of the dialing and message cycles for which the tape can be programmed.

Referring now to FIG. 1 of the drawing in greater detail, the silent burglar alarm system there shown comprises, according to the present invention, a main power-supplying control or supervisory circuit A, a two-channel alarm circuit B composed of a telephone line seizing and dialing tone channel C and a message transmitting audio channel D, and a stop circuit E. The signals to be carried by the channels C and D are prerecorded in accordance with any desired programming scheme, to be more fully described hereinafter, onto an endless magnetic tape T arranged to be driven by a small synchronous motor M. The entire system, including the motor, the tape cartridge, the reading head for the latter, and the power-supplying battery 10 are incorporated in a suitable housing (not shown) in which also is provided a connector panel 11 having 12 terminals 12 to 23 thereon. The special designations and the manner of use of these terminals will be more fully explained presently.

The control or supervisory circuit A which includes, in series with the 6-volt battery or power supply 10, the coil of a relay K-1 and a parallel resistance-capacitance network 24, is connected by conductors 25 and 26 across the terminals 14 and 15 of the panel 11, designated by the legend PANIC. As can be seen, any shorting of these terminals will complete the battery circuit. In actual practice, therefore, these terminals are bridged by a normally open, manually operable momentary switch of any suitable type, for example such as are generally termed "Panic Buttons" and are frequently unobtrusively located near the working stations of bank tellers or clerks in business establishment to enable them to give an alarm signal without alerting the burglar or holdup man to the fact that it has been done. The conductors 25 and 26 are also connected across the normally open contacts *k*-2 of a relay K-2 the coil of which is connected across the terminals 12 and 13 of the panel 11, designated by the legend DC START. These terminals are adapted to be connected to any suitable source of emergency-generated potential (not shown), such as an independent power circuit controlled by a magnetic proximity actuator, by an electric eye, or by any other suitable circuit-closing emergency-responsive means.

The arrangement thus is such that the control circuit A may be closed in two independent ways, either by depressing the panic button to short the terminals 14 and 15 or by closing the relay contacts *k*-2 through energization of the relay K-2 via the terminals 12 and 13 by an external power source.

As soon as the control circuit is closed, the relay K-1 is momentarily energized by the discharge of the capacitor of the network 24 through the coil of the relay, closing the normally open contacts *k*-1 thereof. When these contacts are closed, a circuit is established from one terminal of the battery 10 through the emitter and collector of a transistor Q-1, the coil of a relay K-3, and a conductor 27 to the other battery terminal, while at the same time a forward bias is applied to the base of the transistor Q-1 via a diode CR-2 to cause the transistor to "turn on," i.e. to cause a collector current to flow. This energizes a relay K-3 and closes the normally open contacts *k*-3 thereof, which then complete the same circuit independently of the contacts *k*-1 and function to hold the relay K-3 energized and the transistor Q-1 "on" even though almost immediately thereafter the relay contacts *k*-1 are opened upon deenergization of the relay K-1. Only physically disconnecting one of the battery terminals or, equivalent thereto, biasing the transistor to cutoff will then break the holding circuit. Any tampering with the alarm to keep it from functioning is thus effectively prevented.

Upon occurrence of the actions so far described, the energization circuit for the motor M is completed from one terminal of the battery 10 through the conductors 26, 28, 29, 30 and 31, the closed contacts *k*-3 of the relay K-3, and the conductor 27 to the other battery terminal. At the same time, an indicator lamp L connected in parallel with the motor lights up to indicate that the motor is running. It will be readily understood, therefore, that the motor will remain energized until the transistor Q-1 is tuned "off." The means for effecting this last result will be more fully described presently.

The tone channel C of the alarm circuit B generally comprises a conventional three-stage amplifier 32, hereafter referred to as the control amplifier, including transistors Q-2, Q-3 and Q-4 and associated resistors and capacitors in arrangements not necessary to describe in detail. The output of this amplifier is fed into a twin-diode voltage doubler rectifier 33 the output of which in turn is applied across the base and emitter of transistor Q-5 of a DC amplifier 34. The output of the latter is applied to the coil of a relay K-4 which, when energized, closed its normally open contacts *k*-4 so as to complete the circuit between the terminals 22 and 23 of the panel 11 through conductors 35 and **35*a* and the secondary coil 36*b* of a transformer 36. In actual practice, the terminals 22 and 23** are connected to the telephone line servicing the establishment where the alarm system is installed, and thus it will be seen that closing of the contacts *k*-4 effectively simulates the lifting of the telephone receiver off the hook without requiring that action to be performed. This will hereafter be referred to as " seizing" the telephone line.

The tone channel C functions to amplify and transmit to the transistor Q-5 a tone signal which is derived from a prerecorded tone track *t–t* in the tape T of the tape cartridge constituting a part of the system according to the present invention. The tone track, which is also programmed for periodic interrupting signal sequences to simulate the dialing of a telephone, is sensed by an appropriate portion of the magnetic reading head H and the resultant signals are applied via conductors 37 and 38 to the input of the first stage of the control amplifier 32. Thus, whenever the tape is being driven by the motor M, a continuous tone signal will provide an output from the transistor Q-5 of the DC amplifier 34 which will maintain the relay K-4 energized and the telephone circuit completed, while a sequence of interrupted signals (of respective durations corresponding to the numbers to be dialed) will cause the relay K-4 to be deenergized at the respective pulse rates, opening the telephone circuit repeatedly in a manner simulating the actual dialing of a telephone number.

In this connection it is to be noted that in the tone channel C the output capacitor C-1 of the doubler rectifier 33 is connected in series with a series-connected resistor R-1 and capacitor C-2. The resistor is bridged, and thus may be shunted out, by a switch S-1 which is accessible from the exterior of the alarm system housing and preferably designed for actuation only by a key. The capacity of C-2 is, however, considerably greater than that of C-1. Accordingly, if the switch S-1 is closed, the time constant of the circuit is increased to an extent sufficient to prevent the signal variations corresponding to the dial pulses from being reproduced as bias variations at the base of the transistor Q-5, thereby maintaining the bias constant even during a dialing signal sequence. Closing of the switch S-1 may be used, therefore, to prevent inadvertent dialing, for example while testing the circuit, whereas for actual operation of the system the switch must be in the open position as illustrated.

The audio channel D comprises a three-stage amplifier 39, hereafter referred to as the audio amplifier, including transistors Q-6, Q-7 and Q-8 and associated resistors and capacitors not necessary to describe in detail. The audio output of the transistor Q-8, primarily consisting of signals representing spoken messages, is applied to the primary coil **36*a* of the transformer 36 and therethrough to the secondary coil 36*b* and to the telephone line via the conductors 35 and 35*a*** whenever the relay contacts *k*-4 are closed. The audio signals are derived from a prerecorded audio track *t-a* on the tape T, which track is sensed by another portion of the magnetic reading head H. The resultant audio signals are applied to the input of the first stage of the audio amplifier 39 via conductors 40 and 41.

The stop circuit E is also connected to the output of the audio amplifier 39 via conductors 42 and 28 and comprises a diode rectifier 43 the output of which is applied via conductors 44 and 26 and diode CR-3 to the base emitter circuit of the control transistor Q-1. The stop signal is, as will be explained more fully hereinafter, prerecorded onto the audio track *t-a* of the tape T, and the arrangement is such that when this stop signal is sensed by the reading head H and, after amplification and rectification, is applied to the base of the transistor Q-1, it biases the transistor to cutoff. The interruption in the flow of collector current thus deenergizes relay K-3, causing the contacts *k*-3 thereof to open so as to break the holding circuit. This in turn stops the motor M and the tape T. With no tone signal being fed into the tone channel, the relay K-4 is deenergized, causing its contacts *k*-4 to open and disconnect the system from the telephone line (equivalent to hanging up the receiver).

In operation, when the system is to be placed in use, the proprietor of the guarded premises first makes sure that the key switch S-1 is in the open position. The circuits are then in the illustrates states, ready for activation upon occurrence of an emergency of the type contemplated in the guarded premises.

If, now, the control circuit A is closed, either by some person in the guarded premises depressing the panic button momentary switch to short the terminals 14 and 15 to each other, or by a suitable emergency-generated potential being applied across the terminals 12 and 13, for example by operation of the reed switch of a magnetic proximity actuator upon unauthorized opening of a door or window, or by the breaking of a beam of light directed against a photocell, or in any other suitable manner, to energize the relay K-2 and close the contacts *k*-2 thereof, the relay K-1 is energized, closing the contacts *k*-1 thereof. This simultaneously starts the motor M and turns the control transistor Q-1 "on" so as to energize the relay K-3 and close the contacts *k*-3 thereof. The so completed holding circuit then maintains the motor energized and running even though the relay K-1 thereafter deenergized substantially immediately.

With the motor running, the tape T is moved past the reading head H, causing in the first instant a continuous tone signal to be derived from the track *t-t*. This tone signal, after amplification and rectification in the tone channel C, is applied to the base of the transistor Q-5 so as to turn the same "on," whereby the relay K-4 is energized, closing the contacts *k*-4 thereof and "seizing" the telephone line.

It is deemed advisable at this point to digress for the moment to FIG. 2 for an explanation of the programming of the two prerecorded signal tracks in the tape T in accordance with the principles of the present invention. As there shown, the audio track is divided into a plurality of separate segments one of which is a recording of a stop tone signal and the others of which are recordings of a plurality of series of alarm messages. Concurrently, the tone track provides a tone signal which is by and large continuous, except that in certain spaced sections staggered or alternating with respect to the message signal sections of the audio track, the tone track recording is programmed to provide tone signal variations or pulses corresponding to predetermined telephone number digit sequences. As clearly shown in FIG. 2, the stop tone section of the audio track is located immediately before the first dialing section of the tone track.

It will be understood that the audio track may have only one stop signal section and one message signal section, and that concomitantly the tone track may have only one dialing section arranged intermediate the two audio track sections, but the use of a plurality of message and dialing sections is preferred for reasons which will become clear as the description proceeds.

Reverting now to the operation of the system, the tape T is initially located with the start of the tone track in the first dialing section immediately adjacent the appropriate sensing element of the magnetic reading head H, so that as soon as the motor M is set into operation, and the tape T caused to move, a continuous tone signal is generated which, as explained, energizes relay K-4 to effect seizure of the telephone line. Almost immediately thereafter, the first section of the tone track begins to provide signal output variations or pulses which, when applied to the base of the transistor Q-5, cause the same to be turned "off" and "on," i.e. "cliked," so as to in turn deenergize and reenergize the relay K-4 in a corresponding manner. The durations of the pulses are predetermined in accordance with the numbers to be dialed. The so effected opening and closing of the telephone line by means of the relay contacts *k*-4 thus simulates the function normally performed by the dialing of the standard telephone. As will readily be understood, the signal sequence programmed onto the first dialing section of the tone track of tape T will be that corresponding to the desired location to be called, for example a first police station. When the first dialing cycle controlled by the tone track has been completed, the latter continues to provide a continuous tone signal to maintain the relay K-4 energized and the telephone line seized.

Shortly thereafter, the first message section of the audio track reaches the reading head H. In this section of the audio track, the alarm message, giving the nature and location of the emergency, will be repeated a number of times, and corresponding signals will be amplified and transmitted via the telephone line connected to the terminals 22 and 23. Preferably the arrangement is such that this portion of the operation lasts for approximately 1 minute, which will ordinarily give the desk officer at the police station which has been dialed adequate time to lift the receiver and hear a complete alarm message being transmitted (even if he picks up in the middle of one message). The officer is thus in a position immediately to dispatch the needed help to the indicated location, whereby the heretofore encountered delays in securing help, arising from the usual need of the central security office to first communicate the nature of the emergency to the police station in order to have help dispatched, are effectively minimized.

Upon completion of the first message cycle, the toe track is briefly interrupted to cause the relay K-4 to be deenergized in a manner simulating the hanging up of the receiver, thereby to break the first telephone circuit. Thereafter, the tone track is again programmed for a second dialing cycle while concurrently the audio track provides no signals. The second dialing pulse sequence generally will be of a telephone number different than the one dialed first, for example that of a second police station, to which the alarm messages will then be transmitted during the second message cycle of the audio track. The aforesaid operations are then effected correspondingly for each subsequent dialing cycle and message cycle until the last one.

By virtue of this system, therefore, the guarded premises have available to them a corresponding number of sources of assistance. The advantages of such an arrangement are manifold. Thus, under the most favorable circumstances, help can come from a number of different sources at the same time. The present invention, however, also guards against the possibility of the first one or more dialing and message cycles being completed before the officers at the called police station or stations answer the phone, since the chances are almost nil that none of the called stations programmed into the tape will answer within the available time limit, i.e. before the tape comes to a stop. Quite obviously, the number of complete dialing and message cycles programmed into the tape will depend on the size of the cartridge and length of tape available. In one system according to our invention, we have found an optimum number of such cycles for a 5-minute tape running time to be four dial and message cycles, with each message cycle lasting approximately 1 minute.

At some predetermined time interval following the completion of the last message cycle on the audio track, and it should be understood that this time interval may be omitted completely, the audio track provides a tone signal which is applied to the input of the rectifier is applied to the base of the transistor Q-1, as previously explained, it biases the latter to cutoff, thereby breaking the holding circuit and deenergizing the entire system. As clearly indicated in FIG. 2, the stop tone is programmed into the audio track between the last and first message sections, not necessarily immediately following the last message section but immediately preceding the first dialing section of the tone track. This ensures that the tape will automatically stop at the beginning of the tone track, so that the start of the first dialing section will be located in immediate proximity to the reading head H. In this manner, when the motor M is started upon the next energization of the system, the tone signal to seize the telephone line and commence the dialing operation is immediately applied to the control amplifier and there is no running of blank tape.

The provision of a tape cartridge with dual audio and tone or control tracks in accordance with the present invention leads to still other advantages. Thus, it is possible to replace one cartridge with another one provided with a different recording of telephone numbers or call sequences, or both. The unit is thereby further rendered easily adaptable to removal from one location and reinstallation at a completely different location, and also easily adaptable for reprogramming to respond to different types of emergency situations, such as burglary at one time, fire at another, etc. Moreover, the possibility of misalignments of the tape relative to the reading head at the end of a complete run of dialing and message cycles is effectively eliminated, as is the likelihood of damage to the tape, both of which could occur were outside instrumentalities such as separate control circuitry or mechanical tape-stopping means to be employed.

The silent alarm system according to the present invention is, furthermore, of greatly simplified construction, requiring practically no servicing or maintenance other than a relatively infrequent replacement of the battery 10. It will also be noted that only one such battery is required for the entire system, whereas known silent alarms usually require two power supplies for the supervisory and alarm circuits, respectively.

It will be noted that in the alarm system of the present invention as so far described, it is contemplated to implement the message transmission by a direct connection of the system to the telephone line via the terminals 22 and 23 on the panel 11. Nevertheless, the same effect may be achieved with the aid of an alarm coupler such as the type normally provided by the telephone company under the designation KS-20008. Connection to the coupler is provided by a 6-conductor cable with the individual wires being covered, respectively, by red, green, blue, white, black and orange insulation. These conductors are intended to be connected to the correspondingly color-designated ones of the terminals 18 to 23 on the panel. This cable transmits all the information from the device to the coupler unit, which in turn transmits said information through the telephone lines. The use of the coupler, however, also requires an 18-volt DC power source. In practice, this power source is connected across the terminals 16 and 17 with the indicated polarities. As clearly shown in FIG. 1, the terminals 16 and 19 are connected, respectively, to the contacts *k*-5 of a relay K-5 the coil of which is connected in parallel with the motor M and indicator lamp L. The terminals 17 and 18 are internally connected together, as are the terminals 20 and 21 which are jointly connected to one of the members of the contacts *k*-4 of the relay K-4 through a protective diode CR-4. It will be apparent, therefore, that when the control circuit A is energized and the motor started, the relay K-5 is simultaneously energized closing the contacts *k*-5 thereof and permitting the 18-volt supply potential to be applied to the coupler. Otherwise the various elements function in the identical manner hereinbefore described.

While the invention has been described in connection with an alarm system and with an existing telephone-dialing system, its use is not restricted thereto, but may extend to a number of other applications. Thus, it may well be used with other sensing devices and with transmitting media other than a telephone-dialing system. For example, prerecorded control signals, other than telephone-dialing pulses, and other informations than oral telephone messages, may be programmed into the device to enable other uses than that described and illustrated herein.

It will be understood, therefore, that the foregoing description of the present invention is for purposes of illustration only and that the various structural and operational features and relationships disclosed herein are susceptible to being changed and/or modified in a number of ways none of which involves a departure from the spirit and scope of the present invention as defined in the hereto appended claims.

Having thus described our invention, what we claim and desire to protect by Letters Patent is:

1. An electronic-signaling device for sequentially transmitting a plurality of messages indicating the occurrence of a predetermined condition over a telephone line to a plurality of receiving stations comprising, a supervisory circuit having a source of power therein, said supervisory circuit having a source of power therein, said supervisory circuit having a normally inactive condition and an active condition to which said supervisory circuit is adapted to be energized upon the occurrence of a predetermined condition, an electric motor connected to said supervisory circuit and energizable in response to energization of said supervisory circuit to said active condition, a transmission circuit for transmitting information over a telephone line to said plurality of receiving stations upon energization of said supervisory circuit to said active condition, said transmission circuit including a tone transmission channel connectable with the telephone line for sequentially transmitting a plurality of pulsing sequences thereto each of which correspond to the telephone number of one of said plurality of receiving stations and an audio transmission channel connectable with the telephone line for sequentially transmitting a plurality of messages to the telephone line each of which corresponds to a message desired to be transmitted to one of said plurality of receiving stations upon the occurrence of said predetermined condition, said audio transmission channel being further operable to direct a stop signal to deenergize said supervisory circuit to said inactive condition after said plurality of messages have been transmitted thereby, information carrying means associated with said transmission circuit and adapted to be driven by said electric motor, said information carrying means including first and second signal tracks each of which has prerecorded information thereon, said first track being associated with said tone transmission channel and having a generally continuous signal thereon, said generally continuous signal including a portion thereof for effecting seizure of the telephone line, a plurality of pulsing sequences incorporated therein with the pulses of each sequence corresponding to the digits of the telephone number of one of said plurality of receiving stations and an interrupted portion located between two of said pulsing sequences for releasing the telephone line to enable said telephone line to be seized to transmit another of said plurality of messages to another of said plurality of receiving stations, said second track being associated with said audio transmission channel and having a plurality of messages thereon each of which corresponds to the message desired to be directed to one of said plurality of receiving stations and a stop signal thereon for effecting deenergization of said supervisory circuit to said inactive condition, said stop signal being sequentially disposed after said plurality of messages, reading means for sensing said prerecorded information on said information carrying means in response to actuation of said electric motor and transmitting said information on said first track to said tone transmission channel and said information on said second track to said audio transmission channel, first circuit means connectable to said telephone line and coupled to said audio transmission channel for transmitting said messages to the telephone line, said first circuit means including second circuit means having a normally inactive condition and an active condition for effecting seizure of the telephone line, third circuit means adapted to be connected to the telephone line and coupled to said tone transmission channel, said third circuit means being operable to effect energization of said second circuit means to said active condition to effect seizure of the telephone line in response to said tone transmission channel receiving said portion of said continuous signal for effecting seizure of the telephone line and being operably to effect energization of said second circuit means to said inactive condition to release a seized telephone line in response to said tone transmission channel receiving said interrupted portion of said continuous signal to enable the telephone line to be seized to transmit another of said plurality of messages to another of said plurality of receiving stations, and holding circuit means coupled between said audio transmission channel and said supervisory circuit to effect deenergization of said supervisory circuit to said inactive condition in response to said audio transmission channel transmitting said stop signal thereto after said plurality of messages have been sequentially directed to said plurality of receiving stations to thereby stop said electric motor.

2. An electronic-signaling device as defined in claim 1 wherein said holding circuit means has a normally inactive condition and an active condition to maintain said electric motor energized in response to energization of said supervisory circuit, said holding circuit means maintaining said electric motor in an energized condition independently of release of the telephone line effected by said interrupted portion of said generally continuous signal and deenergizing said electric motor and said supervisory circuit in response to said audio transmission channel transmitting said stop signal to said holding circuit means.

3. An electronic-signaling device as defined in claim 2 wherein said information carrying means includes an endless recording tape having said first and second tracks thereon and said stop signal includes a tone signal disposed on said second track.

4. A device according to claim 3, further comprising key switch-controlled transient circuit means incorporated in said audio transmission channel for selectively enabling and inhibiting transmission of said tone signal pulses to said third circuit means.

5. A device according to claim 4 further comprising additional circuit means adapted to coact with said first, second and third circuit means and with said supervisory and holding circuits for enabling connection of the system to a telephone line through the intermediary of a telephone company-supplied coupler.

6. A device according to claim 1, said supervisory circuit being provided with normally open terminal means for enabling independent closing of said supervisory circuit either in response to the closing of a switch or in response to the application of an emergency-generated relay-energization potential.

PO-1050
(5/69)

UNITED STATES PATENT OFFICE
CERTIFICATE OF CORRECTION

Patent No. 3,598,918 Dated August 10, 1971

Inventor(s) Alfred G.Dee; Jos Van Marrewyk

It is certified that error appears in the above-identified patent and that said Letters Patent are hereby corrected as shown below:

| | |
|---|---|
| Col. 2, line 18: | "trace" should read---track---. |
| Col. 6, line 13: | "toe" should read---tone---. |
| Col. 6, line 49: | After "rectifier" please insert ---43 via the conductors 42 and 28. When the output of the rectifier---. |
| Col. 7, Claim 1, line 5 & 6: | Delete "said supervisory circuit having a source of power therein,". |
| Col. 8, line 55: | "operably" should read---operable---. |

Signed and sealed this 29th day of February 1972.

(SEAL)
Attest:

EDWARD M.FLETCHER,JR.
Attesting Officer

ROBERT GOTTSCHALK
Commissioner of Patents